United States Patent
Towkan

(10) Patent No.: US 8,851,858 B2
(45) Date of Patent: Oct. 7, 2014

(54) PROPELLER BLADES HAVING ICEPHOBIC COATING

(75) Inventor: Michael Fedor Towkan, Gloucester (GB)

(73) Assignee: GE Aviation Systems Limited (GB)

(*) Notice: Subject to any disclaimer, the term of this patent is extended or adjusted under 35 U.S.C. 154(b) by 412 days.

(21) Appl. No.: 13/218,532

(22) Filed: Aug. 26, 2011

(65) Prior Publication Data
US 2013/0052031 A1    Feb. 28, 2013

(51) Int. Cl.
*B64C 11/20*      (2006.01)
*B64D 15/00*      (2006.01)

(52) U.S. Cl.
CPC ...... *B64D 15/00* (2013.01); *B64D 2700/62096* (2013.01); *B64C 11/205* (2013.01)
USPC ...................................... 416/241 R

(58) Field of Classification Search
USPC ........................ 244/134 R; 416/39
See application file for complete search history.

(56) References Cited

U.S. PATENT DOCUMENTS

| | | | |
|---|---|---|---|
| 2,434,208 A * | 1/1948 | Gaugler et al. | ........... 244/134 E |
| 2,933,419 A | 4/1960 | Fike | |
| 5,908,522 A | 6/1999 | Lofstrom et al. | |
| 2004/0118978 A1 | 6/2004 | Anning | |
| 2010/0008788 A1 | 1/2010 | Barbee et al. | |
| 2011/0038729 A1 * | 2/2011 | Shymanski et al. | ............ 416/39 |

FOREIGN PATENT DOCUMENTS

| | | |
|---|---|---|
| GB | 546626 A | 7/1942 |
| GB | 2285758 A | 7/1995 |
| WO | WO 9304920 A1 * | 3/1993 |
| WO | 2004078873 A3 | 9/2004 |
| WO | 2009136186 A1 | 11/2009 |

OTHER PUBLICATIONS

EP Search Report issued in connection with GB 1015409.4 filed on Sep. 15, 2010, issued Jan. 7, 2011.

* cited by examiner

*Primary Examiner* — Richard Edgar
(74) *Attorney, Agent, or Firm* — GE Global Patent Operation; Mark A. Conklin

(57) ABSTRACT

A propeller blade for rotation about a hub assembly is provided, wherein the propeller blade defines a radial direction along its length from a blade root to a blade tip, the propeller blade comprising: a radially inner region; a radially outer region located between the blade root and the blade tip at a position where rotational forces on the blade are sufficient, in use, to remove ice from an uncoated blade; a coating disposed at least along a leading edge of the propeller blade, the coating comprising an icephobic material, wherein the coating extends along the propeller blade from the radially inner region to the radially outer region.

7 Claims, 2 Drawing Sheets

PROPELLER BLADES HAVING ICEPHOBIC COATING

BACKGROUND OF THE INVENTION

1. Field of the Invention

The field of the invention generally relates to propeller blades for aircraft and in particular, propeller blades for aircraft having means to prevent the buildup of ice thereon.

2. Description of Related Art

Propellers fitted to aircraft that are approved for flight into known icing conditions must include provisions to prevent unacceptable levels of ice accumulation on the propeller blades. Ice build-up on the aerofoil sections of a propeller blade affects the aerodynamic efficiency of the blade. It is therefore desirable to limit the amount of ice that is allowed to accumulate on the blades, to reduce the loss of aerodynamic efficiency. In addition, to prevent damage to the aircraft fuselage in icing conditions, it is desirable to minimize the size of lumps of ice that are shed from the propellers.

In the prior art, an electrical heater system is controlled by a timer to provide cyclic heating of the blades to control the shedding of ice. The heater system includes an electrical heater blanket on each blade, cabling to connect the heater system to the electrical supply, a means to allow the electrical supply to be transferred from the airframe to the rotating propeller, for instance slip-rings and carbon brushes, and an electronic deicing timer. In use, the heater is a considerable drain on the aircraft electrical generator system. Additionally, in the event that the blades are heated excessively, the melted ice can runback and reform behind the electrically deiced area. This is a potentially hazardous condition for an aircraft. Such electrical heating systems typically require in excess of 1200 watts of electrical power per blade to remove ice effectively. The electrical heating blankets extend all the way to the propeller centrebody which provides the aerodynamic interface to the aircraft nacelle. A further drawback of the prior art heating systems is that damage to a heater element can prevent the entire element from functioning.

BRIEF SUMMARY OF THE INVENTION

As described herein, the various exemplary embodiments of the present disclosure overcome one or more of the above or other disadvantages known in the art.

One aspect of the present disclosure relates to a propeller blade for rotation about a hub assembly, wherein the propeller blade defines a radial direction along its length from a blade root to a blade tip, the propeller blade comprising: a radially inner region; a radially outer region located between the blade root and the blade tip at a position where rotational forces on the blade are sufficient, in use, to remove ice from an uncoated blade; a coating disposed at least along a leading edge of the propeller blade, the coating comprising an icephobic material, wherein the coating extends along the propeller blade from the radially inner region to the radially outer region.

This and other aspects and advantages of the present disclosure will become apparent from the following detailed description considered in conjunction with the accompanying drawings. It is to be understood, however, that the drawings are designed solely for purposes of illustration and not as a definition of the limits of the disclosure, for which reference should be made to the appended claims. Moreover, the drawings are not necessarily drawn to scale and that, unless otherwise indicated, they are merely intended to conceptually illustrate the structures and procedures described herein.

BRIEF DESCRIPTION OF THE SEVERAL VIEWS OF THE DRAWINGS

There follows a detailed description of embodiments of the invention by way of example only with reference to the accompanying drawings, in which.

DETAILED DESCRIPTION OF THE INVENTION

Figure 1:
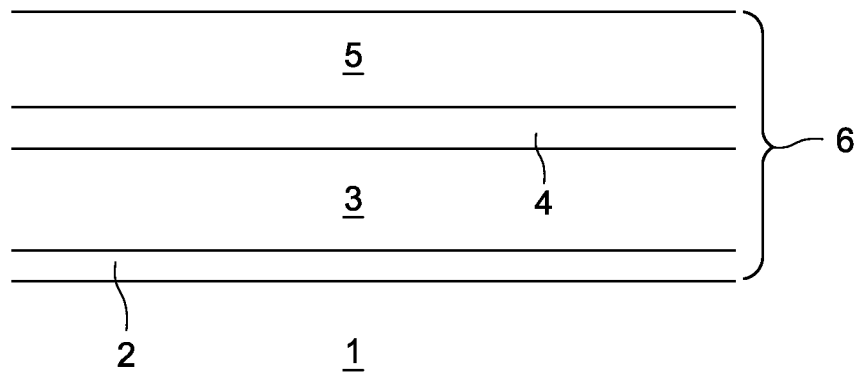
FIG. 1 is a schematic cross-sectional view showing the structure of layers of the blade coating according to one embodiment of the invention.

One aspect of the present disclosure relates to a propeller blade for rotation about a hub assembly, wherein the propeller blade defines a radial direction along its length from a blade root to a blade tip, the propeller blade comprising: a radially inner region; a radially outer region located between the blade root and the blade tip at a position where rotational forces on the blade are sufficient, in use, to remove ice from an uncoated blade; a coating disposed at least along a leading edge of the propeller blade, the coating comprising an icephobic material, wherein the coating extends along the propeller blade from the radially inner region to the radially outer region.

In operation, ice accumulates on the blades until such time as the ice mass is sufficient to cause self-shedding under the action of the centrifugal forces on the ice which result from the rotation of the propeller. The force exerted by the ice mass is equivalent to the weight of the ice, multiplied by the radial location of the ice on the blade, multiplied by the square of the rotational speed of the propeller. When the centrifugal force of the ice exceeds the cohesive bond strength between the ice and the blade, the ice breaks away from the blade surface. Over the length of the blade, as the radius and, thus, the centrifugal field) varies, the amount of ice that has to build up at any specific blade radius to overcome the cohesive bond between the ice and the blade also varies. Near to the tip of the propeller, the centrifugal forces are sufficiently high to prevent significant build up of ice without any icephobic coating.

In one example, the rotational speed of the propeller blade can be of the order of 850 rpm, whereby the centrifugal field outside a radius of 1.39 m (55 inches) provides sufficient force to shed ice from the blade surface without icephobic coating. Where the acceleration of the ice due to the rotation of the blade exceeds 1100 g, the ice tends to self-shed from the blade surface without any coating.

By virtue of the icephobic coating being a passive system, if the coating is damaged, for example by impacts from foreign objects, the coating still functions even if parts of it are destroyed. The embodiments of the invention additionally reduce the demand on the aircraft electrical system for providing electrical power for propeller deicing. The reduction in the number of required elements in the system gives both technical and commercial benefits, improving reliability and maintainability, and also saving both initial acquisition and ongoing maintenance costs.

The embodiments of the invention advantageously reduce the cohesive bond strength between the ice and the blade, such that the radius at which ice accumulated on the blades self-sheds is reduced. The embodiments of the invention further advantageously ensure the cohesive bond strength at the inboard end of the blade, where the blade intersects with the spinner or nacelle, is such that the ice build up does not exceed the maximum allowable for both aerodynamic and fuselage impact considerations. Thus, the reliance on providing electrical, or any other form of assistance for ice shedding, is eliminated.

Where a coating according to the invention is utilized, there is still scope for small amounts of ice to form on the icephobic coating, but the material of the coating is chosen to be sufficiently icephobic so that any ice that is formed will self-shed before it has reached an unacceptable size.

The coating can be applied to the blade on manufacture or can be retrofitted to existing propeller blades. Icephobic materials that can be used in the coating include materials that have a tow cohesive coefficient for ice. One example of such a material is PTFE.

FIG. 1 shows the arrangement of layers of a coating 6 applied to a propeller blade 1. A first layer 2 of adhesive is provided directly adjacent the blade surface 1. A layer 3 of polymer is disposed on the adhesive layer 2 and is thereby firmly secured to the blade surface. The polymer layer 3 can comprise one or more rubber materials such as neoprene. Further, the polymer layer 3 can have a thickness in the range 0.5 mm to 1.0 mm, for example. On the neoprene layer 3, a tie coat 4 is disposed to provide a suitable surface for bonding a layer 5 of icephobic material to the coating. The tie coat 4 may have a thickness on the order of 1 micron. The thickness of the icephobic material layer 5 can be approximately 3 mm. The polymer layer 3 can be coloured, whereby wear of the icephobic material layer 5 and the tie coat 4 exposes the polymer layer to provide an indication of wear of the icephobic material layer 5.

Figure 2:
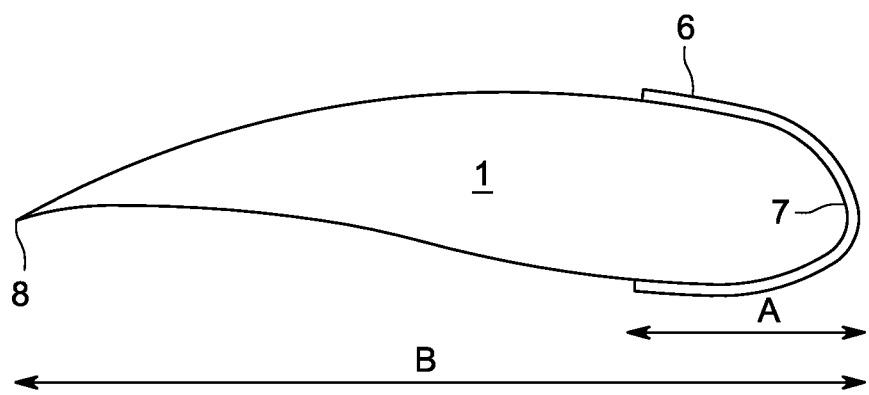
FIG. 2 is a schematic cross-sectional view of a propeller blade according to one embodiment of the invention.

FIG. 2 shows the coating 6 applied to the leading edge 7 of the propeller blade 1. In a preferred embodiment, the coating 6 extends 25% of the chord length of the blade, the chord length being defined as the distance from the leading edge 7 to the trailing edge 8 of the blade 1. in other words, the distance A shown in FIG. 2 is preferably 25% of the distance B. It is desirable to minimize the size of the coating as far as possible to reduce the weight of the propeller blades, while providing sufficient coverage of the blades for the purposes of reducing ice buildup.

Figure 3:
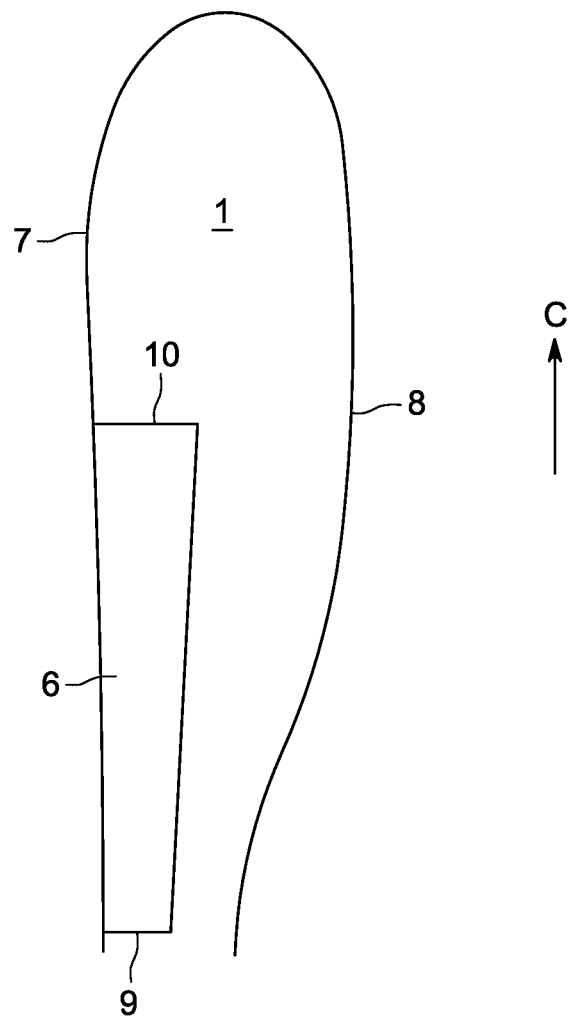
FIG. 3 is a side view of a propeller blade according to one embodiment of the invention.

FIG. 3 shows the blade 1 defining a radial direction C along its length from a blade root to a blade tip, wherein disposed thereon at least along the leading edge 7, the blade has a coating 6. The coating 6 extends along the leading edge blade from a radially inner region 9 to a radially outer region 10. The radial extent of the coating 6 is chosen to provide a low cohesion for ice where it is needed, ie the radially inner portions of the blade, whereas the radially outer portions are subject to high enough rotational forces to cause ice to self-shed from the uncoated blade surface. In one embodiment, the coating can have a cohesive coefficient which varies along the length of the blade, reflecting the fact that the rotational forces increase linearly with radius. The cohesive coefficient can increase with increasing radius, whereby the radially inner regions have the highest propensity for shedding ice. This can be achieved by the use of portions of different icephobic materials along the coating. In this way, it is possible to reduce the cost of the coating by only using the costly icephobic materials in the radially inner regions.

What is claimed is:

1. A propeller blade for rotation about a hub assembly, wherein the propeller blade defines a radial direction along its length from a blade root to a blade tip, the propeller blade comprising:
   a radially inner region;
   a radially outer region located between the blade root and the blade tip at a position where rotational forces on the blade are sufficient, in use, to remove ice from an uncoated blade;
   a coating disposed at least along a leading edge of the propeller blade, the coating comprising an icephobic material, wherein the coating extends along the propeller blade from the radially inner region to the radially outer region and the cohesive coefficient of the coating varies radially along the length of the blade.

2. A propeller blade according to claim 1, wherein the radially outer region lies approximately 50% to 70% along the length of the blade.

3. A propeller blade according to claim 1, wherein the cohesive coefficient increases with increasing radius.

4. A propeller blade according to claim 1, wherein the coating extends from the leading edge of the propeller blade to approximately 25% along the chord length of the propeller blade.

5. A propeller blade according to claim 1, wherein the coating comprises a plurality of layers.

6. A propeller blade according to claim 5, wherein the coating comprises first, second, third and fourth layers.

7. A propeller blade according to claim 6, wherein the first layer comprises an adhesive material, the second layer comprises a polymer, and the third layer comprises a tie coat configured to bind the fourth layer to the second layer.

* * * * *